UNITED STATES PATENT OFFICE.

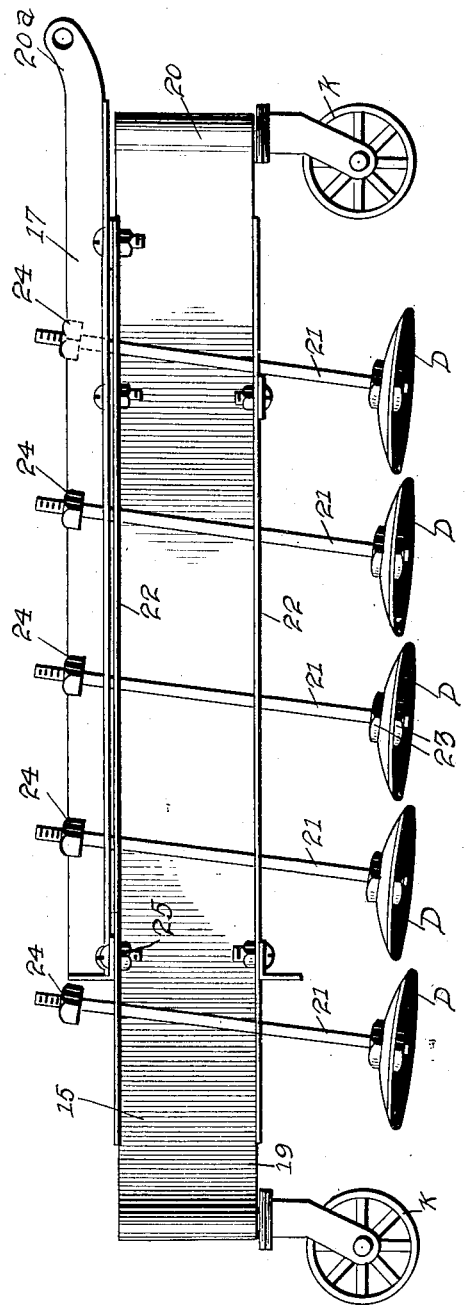

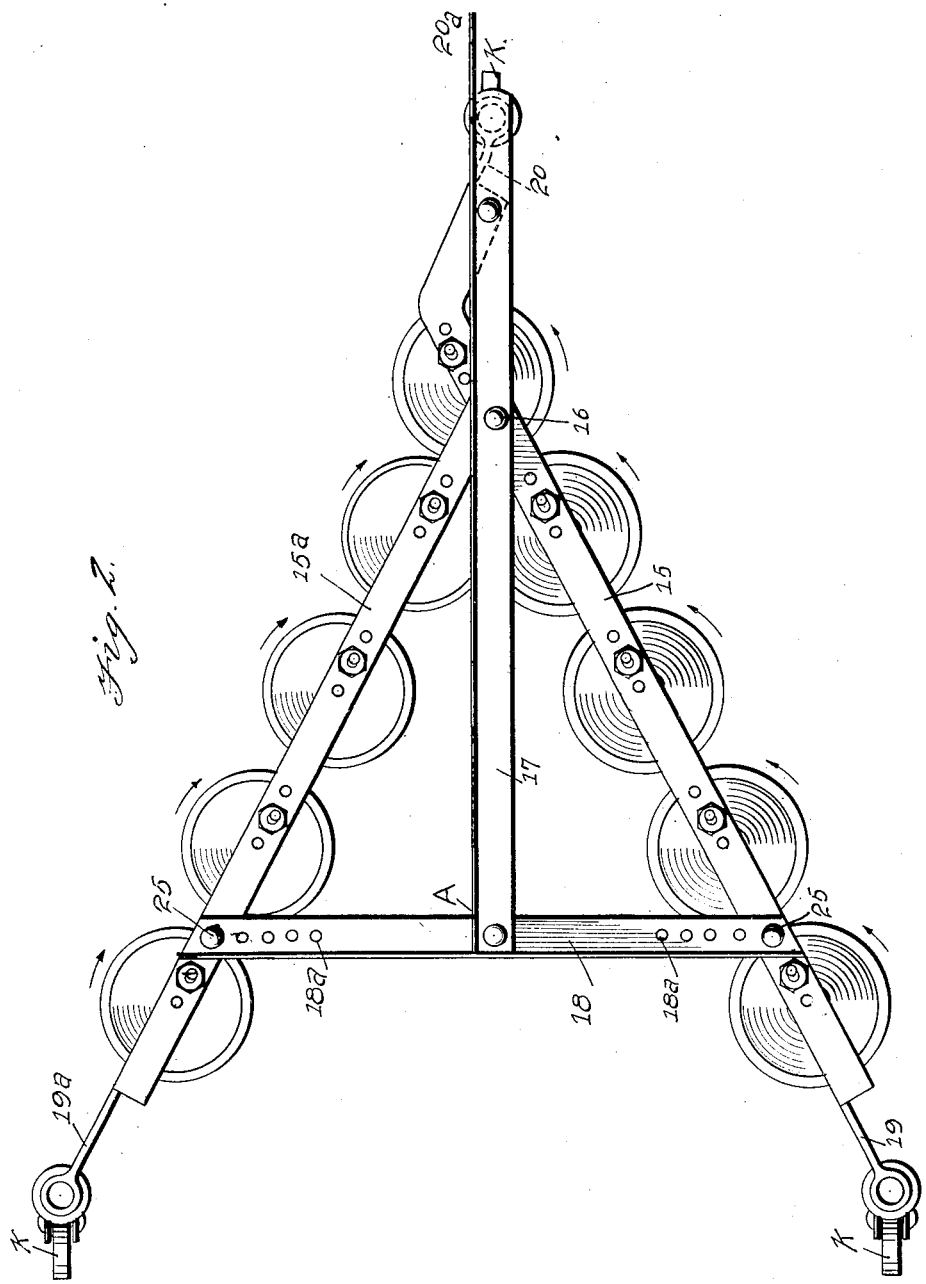

WALTER EDWIN ABERNATHY, OF GREAT FALLS, MONTANA.

WEED-CUTTING APPARATUS.

1,370,774.   Specification of Letters Patent.   Patented Mar. 8, 1921.

Application filed January 14, 1920. Serial No. 351,273.

*To all whom it may concern:*

Be it known that I, WALTER EDWIN ABERNATHY, a citizen of the United States, and a resident of Great Falls, in the county of Cascade and State of Montana, have invented certain new and useful Improvements in Weed-Cutting Apparatus, of which the following is a specification.

My invention relates to an apparatus for cutting weeds in the field, and the purpose of my invention is the provision of such an apparatus having a plurality of cutting disks which travel in the ground in such manner as to be rotated by their coaction with the soil, thus eliminating the necessity of employing additional motive power for the propulsion of the disks.

It is also a purpose of my invention to provide a weed cutting apparatus in which the supporting frame for the disk is adjustable to vary the area traversed by the disks so that the apparatus can be accommodated to fields or patches of weeds of various dimensions.

A further purpose of my invention is the provision of means for adjustably supporting each disk in the frame so that the angle and depth of its travel through the soil can be regulated.

I will describe one form of weed cutting apparatus and will then point out the novel features thereof in claims.

In the accompanying drawings:

Figure 1 is a view, showing in side elevation one form of weed cutting apparatus employing my invention; and Fig. 2 is a top plan view of the apparatus shown in Fig. 1.

Similar reference characters refer to similar parts in each of the views.

Referring specifically to the drawings, A designates generally a frame which is supported on universally mounted casters K for ready movement over the ground, the frame in turn supporting a plurality of disks D which are designed to travel in the soil for effecting a cutting of the weeds as the apparatus is drawn over a field. The frame A is composed of diverging beams 15 and $15^a$ pivotally connected at their forward ends by a king bolt 16 which is mounted in a draft beam 17 supported on the beams 15 and $15^a$ adjacent its forward end and rigidly upon a transverse beam 18 at its rear end.

The casters K are three in number, the two rear casters being supported on extensions 19 and $19^a$ formed on the beams 15 and $15^a$, respectively, while the front caster is supported on an extension 20 provided on the front end of the beam 15. As shown in Fig. 2, the beam 15 exceeds in length the beam $15^a$ so that the forward end of the former projects beyond the latter. The purpose of this arrangement is to accommodate an extra disk D as will be more fully explained hereinafter. The projecting end of the beam 15 is bent at an angle for a portion of its length so that it is disposed substantially parallel to the beam $15^a$ with its free end directly below the draft beam 17. The latter beam is formed at its forward end with an extension $20^a$ to which a draft appliance of any suitable form is adapted to be attached for drawing the apparatus over a field, wherefor it will be seen that the line of draft is along the beam 17.

As illustrated to advantage in Fig. 1, the disks D are arranged in sets, one set being carried by each of the beams 15 and $15^a$. The disks carried by the beam 15 exceed in number by one the disks carried by the beam $15^a$, this extra disk being supported upon the projecting forward end of the beam 15 and arranged so that it spans the gap between the two forward disks. As shown in Fig. 1, each disk is of convexed formation, and is supported upon a rod 21 that is slidably fitted in flanges 22 formed on the beams 15 and $15^a$. The disk is secured to the rod at its lower end by a pair of nuts 23, and the rod is prevented from dropping from the beam by a nut 24 which threadedly engages the upper threaded end of the rod. As shown in Fig. 1, the flange 22 of the beams 15 and $15^a$ are provided with a plurality of registering perforations for each of the rods 21 so that by inserting the rod in the desired pair of perforations, the desired angle at which the corresponding disk is supported can be regulated. As shown in Fig. 1, the beam 18 is provided with a series of perforations $18^a$, which are designed for the purpose of permitting of a lateral adjustment of the converging beams 15 and $15^a$ with respect to each other so that the distance between the two may be varied. Bolts 25 are employed for connecting the beams 15 and $15^a$ with the beam 18, it being understood that the bolts are adapted to be placed within any of the perforations $18^a$ for securing this lateral adjustment, and that as the beams are adjusted they swing about the king bolt 16 as a center.

In the operation of the apparatus, the line of draft being along the beam 17 and the disks disposed on an incline with relation to the horizontal as shown in Fig. 1, it will be obvious that the disks during the forward movement of the apparatus will be caused to penetrate the soil and to be rotated so as to effect a cutting of the weeds at a point beneath the surface of the ground. The disks on the beams 15 and 15ª are rotated in the directions indicated by the arrows, it being understood that as a result of the frictional contact between the soil and the disk, a substantially tangential force is exerted on the disks to cause their rotation. As the disks are fixed to the rods 21 it is obvious that the rods also rotate within the flanges 22, and the latter being free to move vertically, it is apparent that the disks are also capable of vertical movement so that when they encounter an obstruction they are automatically elevated so as to slide over the obstruction and thus permit the progress of the apparatus over the field. Should it be desired to cover a greater area with the apparatus, the two sets of disks may be spread by adjusting the beams 15 and 15ª upon the beam 18 in the manner previously described. If the particular angle at which the disks are adjusted does not cause the cutting of the weeds at the desired depth, the angular position of the disks may be varied so as to cause the same to cut the weed at the desired point.

Although I have herein shown and described only one form of weed cutting apparatus embodying my invention, it is to be understood that various changes and modifications may be made herein without departing from the spirit of the invention and the spirit and scope of the appended claims.

Having thus described my invention, what I claim is:

1. A weed cutting apparatus comprising a frame including a draft beam, an adjusting beam secured to the draft beam, diverging beams pivotally connected to the draft beam and adjustably associated with the adjusting beam, disks carried by the diverging beams, and means for rotatably supporting the disks upon the diverging beams and for supporting the disks at different inclinations with relation to the horizontal.

2. A weed cutting apparatus comprising a frame including a draft beam, an adjusting beam fixed to the draft beam, diverging beams pivotally connected to the draft beam and adjustably associated with the adjusting beam, flanges formed on the diverging beam, rods slidable through said flanges at different angles with relation to the flanges, and disks fixed to said rods.

WALTER EDWIN ABERNATHY.